INVENTOR.
MILTON W. GREEN
BY
Milton S. Winters
ATTORNEY

FIG. 6.
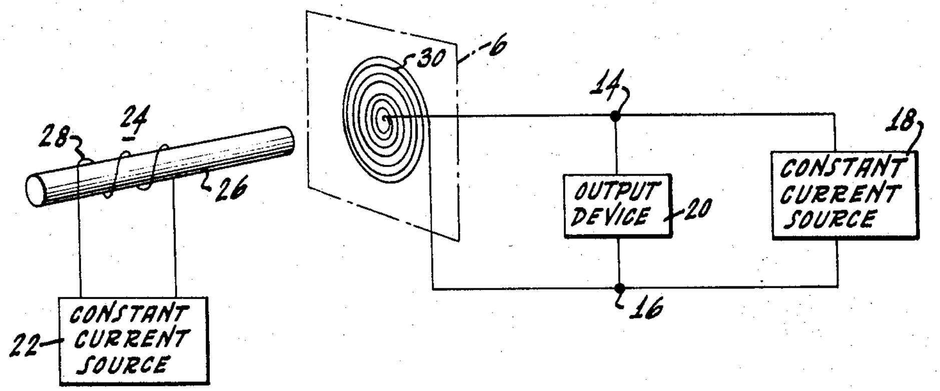
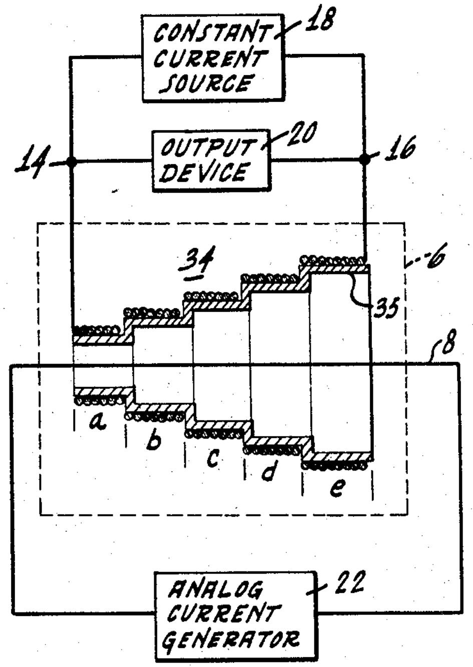
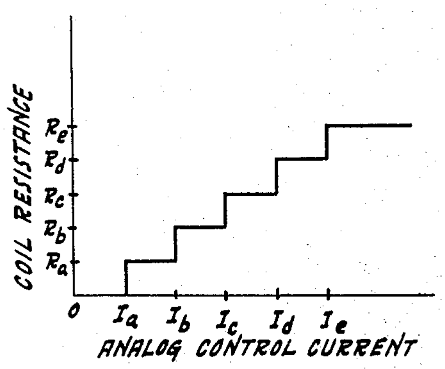
FIG. 8.
FIG. 7.
INVENTOR.
MILTON W. GREEN
BY
Milton S. Winters
ATTORNEY United States Patent Office 3,419,712
Patented Dec. 31, 1968

3,419,712
FUNCTION GENERATION AND ANALOG-TO-DIGITAL CONVERSION USING SUPERCONDUCTING TECHNIQUES

Milton W. Green, Menlo Park, Calif., assignor to Radio Corporation of America, a corporation of Delaware Continuation of application Ser. No. 797,404, Mar. 5, 1959. This application Nov. 29, 1962, Ser. No. 242,040
11 Claims. (Cl. 235—197)

This invention relates to computing devices and, in particular, to function generators. This application is a continuation of my pending application Ser. No. 797,404, filed Mar. 5, 1959.

Function generators are used extensively, for example in analog computers, for generating electrical analogues of quantities which may vary continuously. Such analogues are necessary for the analog solution of some equations and problems. Both electrical and electromechanical devices are used for this purpose. In general, the electrical devices have better high frequency response, whereas the electromechanical devices are usually more accurate. It is desirable in the interest of high speed computation to provide a function generator which is not limited in high frequency response by the inertia of mechanical components, yet which has a very high degree of precision. It is also desirable that the function generator be small in physical size and have low power requirements.

It is an object of this invention to provide an improved function generator.

It is another object of this invention to provide a function generator which is free of moving parts and which has a high degree of precision.

It is still another object of this invention to provide apparatus of the type described which is small in size and which has low power requirements.

A further object of this invention is to provide an improved computing device for generating a function of an independent variable at high speed and with a high degree of precision.

Many measuring instruments provide output information expressed in analog form. When this information is to be operated upon in a digital computer, it is generally necessary to convert the analog quantity to the digital language of the computer.

Accordingly, it is another object of this invention to provide an improved analog-to-digital converter.

It is still another object of this invention to provide an improved analog-to-digital converter which is free of moving components.

These and other objects of the present invention are accomplished by controlling the magnitude of an electrical parameter in accordance with a magnetic field whose intensity at any point is proportional to the independent variable. A superconducting element is disposed in the magnetic field with different portions of the element occupying regions of different field intensity. As the field intensity is varied in accordance with the independent variable, different amounts of the element remain in the superconducting state. That is to say, the resistance of that portion of the element not in the superconducting state is functionally related to the magnetic field intensity and, hence, to the independent variable.

The foregoing and other objects, advantages, and novel features of the invention will be more fully apparent from the following description when read in connection with the accompanying drawings, in which like reference numerals refer to like parts, and in which:

FIGURE 6 is a perspective view of another function generator according to the present invention;

FIGURE 7 is a diagram of a function generator suitable for use as an analog-to-digital converter according to the present invention, and which illustrates a superconducting element in cross-section; and FIGURE 8 is a graph showing the manner in which the resistance of the controlled element of FIGURE 7 varies as a function of analog control current.

Figure 1:
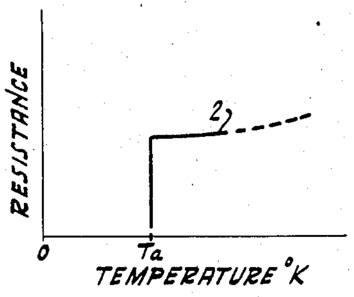
FIGURE 1 is an idealized graph of resistance versus temperature for a material which exhibits the property of superconductivity.

Certain materials exhibit the remarkable property of superconductivity, whereby their electrical resistance drops suddenly to zero at a temperature close to absolute zero. An idealized curve 2 of resistance versus temperature for one such material is illustrated in FIGURE 1. The resistance of the material drops abruptly to zero when the temperature of the material is lowered to a value $T_a$. The exact temperature at which this transition occurs is a characteristic of the material and is different for different materials.

It has been found that the superconductivity of a material is destroyed when the material is subjected to a magnetic field of critical intensity. To explain how superconductivity is related to magnetic field intensity, reference is made to FIGURE 2, which is a family of curves of critical field intensity as a function of absolute temperature for four different metals. Similar curves can be drawn for other materials which exhibit the property of superconductivity. It should be noted that the critical field intensity is a function of both the material and the temperature.

Figure 2:
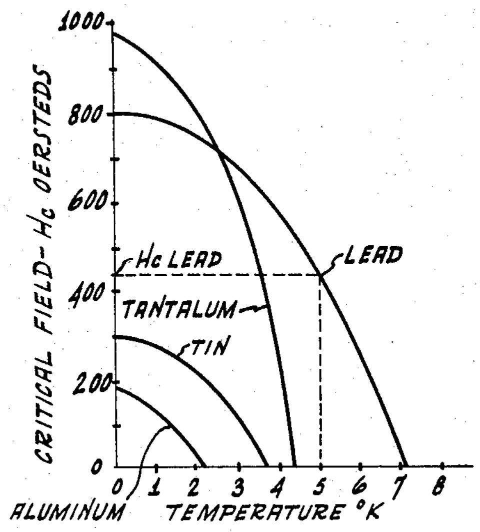
FIGURE 2 is a set of curves illustrating the magnetic field intensities required to destroy the superconductivity of certain materials at various temperatures within the range of superconductivity.
Figure 3:
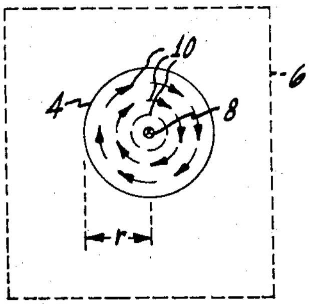
FIGURE 3 is an end view of a current carrying conductor, and a concentric thin ring of superconducting material useful in explaining the significance of the curves of FIGURE 2.

The area below any one curve of FIGURE 2 represents the superconducting state for the corresponding metal; the area above that curve represents the normal resistance state. By way of example, there is illustrated in FIGURE 3 a thin lead ring 4 enclosed in a low temperature environment, indicated schematically by the dashed box 6. The dashed box 6 may be a liquid helium cryostat or other means for cooling the ring 4 to a low value of temperature. Various means for cooling the ring 4 to the desired low temperature are known. These means are described in general in an article entitled, "Low Temperature Electronics," in the proceedings of the IRE, volume 42, pages 408, 412, February 1954, and in other publications. A current carrying conductor 8, illustrated in end view, is located within the area enclosed by the ring 4 and concentric therewith. The direction of current flow in the conductor 8 is denoted by the X, indicating that the direction of current flow is into the plane of the paper. Current flowing in the conductor 8 establishes a magnetic field in the surrounding region. Loci 10 of equal magnetic intensity are illustrated as dashed circles concentric with the conductor 8.

The magnetic field intensity H at any point in space is proportional to the magnitude of the current carried by the conductor 8 and inversely proportional to the distance between the center of the conductor 8 and the point. By way of example, the magnetic intensity at any point on the ring 4, assuming the thickness of the ring to be negligible, is proportional to $I/r$, where I is the conductor current and $r$ is the radius of the ring. In general, superconductivity is first destroyed in those portions of the ring 4 which lie along the inner circumference, and the normal resistance region sweeps toward the outside of the ring as the magnetic field is increased. Several theories have been advanced to explain the transition of an element from the superconducting to the normal resistance state, the discussion of which, however, appears unnecessary to an understanding of the present invention.

Assume that the ring 4 is of lead and is cooled to a temperature of 5° Kelvin (K). By reference to FIGURE 2, it may be seen that the lead ring 4 remains superconducting so long as the intensity of the magnetic field at the ring is less than the critical value of approximately 435 oersteds. Increasing the magnetic field intensity above this value drives the ring out of superconductivity, whereby the resistivity and the resistance of the ring 4 become finite. This finite resistance will be referred to hereafter as the normal resistance.

Figure 4:
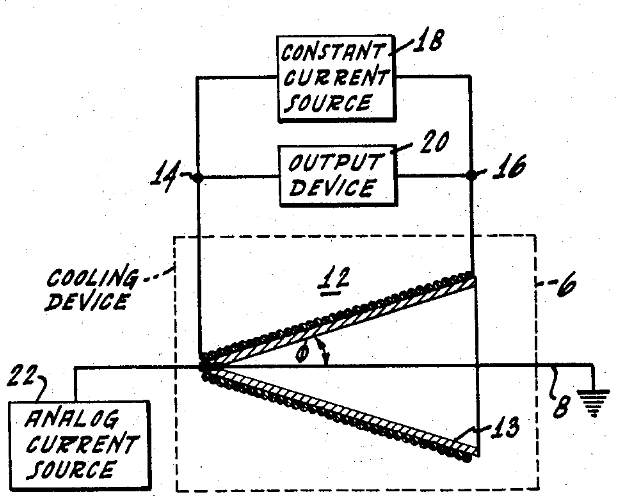
FIGURE 4 is a diagram, partly in block form and partly in cross section, of a function generator according to the present invention.

One embodiment of a function generator according to the present invention is illustrated in FIGURE 4. A coil 12 of wire is wound about a bobbin 13, or form, which has the shape of a right circular cone. The coil 12 and bobbin 13 are shown in cross section for greater clarity. The bobbin 13 may be, for example, a dimensionally stable plastic, the purpose of which is to aid the coil in retaining its shape. The wire may be any metal which exhibits the property of superconductivity. The coil 12 is enclosed within a low temperature environment 6, and the temperature is maintained constant at a desired value within the range of superconductivity. The ends of the coil may be connected to terminals 14, 16, respectively, which serve as output terminals in some applications. A constant current source 18 may be serially connected between the terminals 14, 16. The constant current source 18 may be, for example, a pentode circuit or other suitable constant current device. A current carrying conductor 8 is located within the area enclosed by the bobbin 13 and aligned with the axis of symmetry. One end of the conductor 8 is connected to a reference potential, illustrated as circuit ground. The other end of the conductor 8 is connected to the output of an analog current generator 22. The analog current generator 22 and current carrying conductor 8 may be, for example, a closed loop superconductor which serves as the secondary winding on a transformer, in which event the primary winding may be connected to receive energizing signals representative of the variable quantity whose function it is desired to generate. Whatever the source 22 of analog current, it is only necessary that the magnitude of conductor 8 current by representative of the variable quantity. The conductor 8 may, or may not, be superconducting, depending upon other circuit conditions, such as the particular type of analog current source.

A magnetic field is established about the conductor 8 in response to the current flow therein. The field intensity at any point in space in the vicinity of the coil 12 is directly proportional to the magnitude of conductor 8 current, and inversely proportional to the shortest distance between the point and the conductor, as previously discussed In theory, current flowing in the coil 12 also creates a magnetic field in the surrounding space such that the field intensity at any point thereabout is the vector sum of the field intensities due to the currents in the coil 12 and conductor 8. However, the field contribution from the coil 12 current may be held at a very low relative value, for example one percent, by properly selecting the relative magnitudes of the currents flowing in the coil 12 and the conductor 8. Where extreme accuracy is desired, the field contribution from the coil 12 current may be compensated for in the design of the coil 12, inasmuch as the coil current and resulting magnetic field are constant for all practical purposes, regardless of the degree of superconductivity of the coil 12.

Because of the particular coil 12 configuration, different portions of the coil are located in regions of different field intensity. The superconductivity of different portions of the coil 12 is therefore destroyed at different magnitudes of conductor 8 current, and the resistance of the coil varies accordingly. The maximum resistance of the coil 12 may be a few to a few hundred ohms. Because the coil 12 is serially connected with a constant current source 18, the voltage developed across the coil, as measured at the terminals 14, 16, varies directly with the resistance of the coil 12. An output device 20, for example a voltmeter having a high internal impedance, may be connected across the terminals 14, 16 to provide an indication of the analog function. The internal impedances of the constant current source 18 and the output device 20 may be selected relative to the maximum resistance of the coil 12 so that the current through the coil 12 is held within desired limits of constancy. The output device 20 may also be another circuit of an analog computer.

It can be shown that the resistance of a coil having the configuration of a right circular cone, as illustrated in FIGURE 4, varies as the square of the conductor 8 current. That is to say, $R_{coil}=kI^2$, where I is the conductor 8 current, and $k$ is a constant of proportionality which depends upon the angle $\phi$, the normal resistivity of the wire, the size of the wire, and perhaps other parameters.

Figure 5:
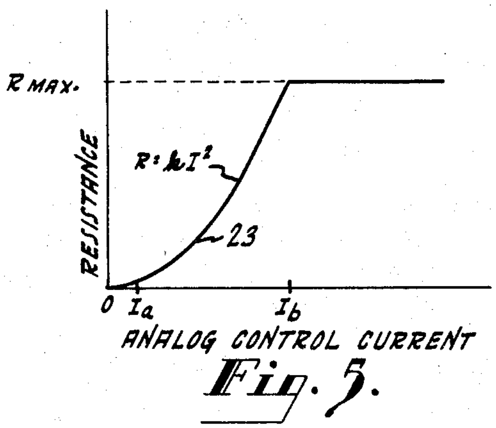
FIGURE 5 is a graph showing the manner in which the resistance of the controlled element of FIGURE 4 varies as a function of the analog control current.

The relationship of coil 12 resistance to conductor 8 current for the arrangement of FIGURE 4 is illustrated graphically in FIGURE 5. The coil resistance increases as the square of conductor current for current up to a value $I_b$. This value of current is sufficient to destroy completely the superconductivity in the coil, and further increases in the conductor current cause no further increase in coil resistance. The length of the coil may be increased, however, to provide a greater operating range as desired. In practice, the resistance-current relationship represented by that portion of the curve 23 immediately adjacent the origin is not attainable because of the finite size of the coil 12 wire, and the relationship may have a slight discontinuity, for example at $I_a$.

The embodiment of FIGURE 4 particularly shows a coil of conical shape for generating a square law function. Other functions of an independent variable may be generated by suitably shaping the coil. The coil is so shaped that the resistance of the coil increases, or remains constant, within certain portions of the operating range, as the magnetic field intensity increases. The superconducting element may, alternatively, be a thin film of superconducting material deposited on a bobbin of selected shape. A coil has the advantage, in some applications, that a greater range of resistance can be obtained.

Another embodiment of a function generator according to the present invention is illustrated in perspective in FIGURE 6. An electromagnet 24 comprises a circularly cylindrical bar 26 of suitable material, such as soft iron, with a coil 28 wound thereabout. The ends of the coil 28 are connected to an analog current generator 22. The current supplied by the generator 22 is representative of an independent variable whose function it is desired to generate. A magnetic field is generated by the current in the coil 28 which is a function of the magnitude of this current. A flat, spiral coil 30 of superconducting material is located in a plane which is, in this case, perpendicular to the axis of the bar 26. The center of the coil 30 may be aligned with the axis of the bar 26. Increasing portions of the coil are driven out of superconductivity as the current in the coil 28 is increased. The configuration of the coil is determined by the function which it is desired to generate. A constant current source 18 is serially connected with the coil 30. As in the previous example, the resistance of the coil 30 is functionally related to the current in coil 28. An indication of the resistance may be derived by connecting a suitable output device 20 to the terminals 14, 16.

In many applications it is required to convert information from analog-to-digital form. Most measuring instruments, for example, provide an output in analog form.

When the information is to be operated upon in a digital computer, that is to say, when the analog information is to be supplied as an input to a digital computer, it is usually necessary first to convert the information from analog-to-digital form.

An embodiment of a function generator which is suitable for use as an analog-to-digital converter is illustrated in FIGURE 7. The superconducting element is preferably a coil 34 of superconducting material which may be wound on a step-shaped bobbin 35 which is symmetrical about a current carrying conductor 8. The sections *a* to *e* of the coil 34 have different diameters, and all portions of any section have the same diameter. Current is supplied to the conductor 8 from a suitable analog current generator 22, which may be of the type previously described. A constant current source 18 is connected in series with the coil 34. The output of the function generator may be derived at the output terminals 14, 16.

The operation of the converter may be best understood with reference to FIGURE 8, which is an idealized graph of coil resistance versus analog control current. Because the current through the coil 34 is constant, the curve of FIGURE 8 also represents the voltage appearing across the output terminals 14, 16 as a function of conductor 8 current. When the magnitude of the analog current is less than $I_a$, the resulting magnetic field intensity is insufficient to destroy superconductivity in any portion of the coil 34. The coil resistance is zero under these conditions. Increasing the conductor 8 current to a value $I_a$ increases the magnetic field intensity to a value sufficient to destroy superconductivity in all portions of section *a*. The resistance of the coil 34 jumps abruptly to a value $R_a$ at this magnitude of analog current. No further increase in resistance occurs until the current attains a value $I_b$, at which time the coil resistance again increases abruptly to a value $R_b$. Similar increases in coil 34 resistance to value $R_c$, $R_d$, and $R_e$ occur at analog current magnitudes $I_c$, $I_d$, and $I_e$, respectively. Further increases in conductor 8 current above $I_e$ result in no further increase in coil 34 resistance because the entire coil is then in the normal resistance state. The incremental increases in coil resistance may be unequal, or may be equalized by a proper selection of the number of turns of wire in each of the sections *a* to *e*. No attempt has been made to show this in FIGURE 7.

It is thus seen that a superconducting element of stepped configuration may be used as an analog-to-digital converter. Such a device has the advantage that its high frequency response is not limited by the inertia of mechanical components. In addition, such devices are small in size, are easily constructed, and have low power requirements. Although only five coil sections are illustrated in FIGURE 7, any number of sections may be provided depending upon the particular application.

What is claimed is:

1. Apparatus for generating a function of a variable quantity comprising: current responsive, magnetic field establishing means; means responsive to the variable quantity for supplying to said field establishing means a current having an amplitude which is proportional to the magnitude of said variable quantity; a body of superconductive material of uniform thickness having ends and being so spaced relative to said field establishing means that successive portions of different spacing along said body, between said ends, are driven from the superconducting to the normal state in succession as the current supplied to said field establishing means is successively increased over a range of values; means for maintaining said body at a temperature at which said body is superconducting in the absence of current supplied to said field establishing means; means supplying a constant current to said body; and output means connected across said ends of said body.

2. An analog-to-digital converter comprising: a current carrying conductor; a step-shaped member of superconductive material concentric with said conductor, the step-shaped portions of said member being so located relative to said conductor that successive step-shaped portions along said member are driven from the superconducting to the normal state in succession as the current in said conductor is successively increased over a range of values; means for maintaining said member at a temperature at which said member is superconducting in the absence of current flowing in said conductor; means for supplying to said conductor an analog current proportional in amplitude to the magnitude of a variable quantity whose measure in digital form is desired; and output means connected across the ends of said member.

3. An analog-to-digital converter comprising: a current carrying conductor; a step-shaped member of superconductive material concentric with said conductor, the step-shaped portions of said member being so located relative to said conductor that successive step-shaped portions along said member are driven from the superconducting to the normal state in succession as the current in said conductor is successively increased over a range of values; means for maintaining said member at a temperature at which said member is superconducting in the absence of current flowing in said conductor; means for supplying to said conductor an analog current proportional in amplitude to the magnitude of a variable quantity whose measure in digital form is desired; means supplying a constant current to said member; and output means connected across the ends of said member.

4. An analog-to-digital converter comprising: a current carrying conductor; a multi-turn, step-shaped coil of superconductive material concentric with said conductor, the step-shaped portions of said coil being so located relative to said conductor that successive, step-shaped portions along said coil are driven from the superconducting to the normal state in succession as the current in said conductor is successively increased over a range of values; means for maintaining said coil at a temperature at which said coil is superconducting in the absence of current flowing in said conductor; means for supplying to said conductor an analog current proportional in amplitude to the magnitude of a variable quantity whose measure in digital form is desired; and output means connected across the ends of said coil.

5. An analog-to-digital converter comprising: a current carrying conductor; a step-shaped member of superconductive material concentric with said conductor, each of the step-shaped portions having the same resistance when in the normal state, said step-shaped portions being so located relative to said conductor that successive step-shaped portions along said member are driven from the superconducting to the normal state in succession as the current in said conductor is successively increased over a range of values; means for maintaining said member at a temperature at which said member is superconducting in the absence of current flowing in said conductor; means for supplying to said conductor an analog current proportional in amplitude to the magnitude of a variable quantity whose measure in digital form is desired; and output means connected across ends of said member.

6. The converter as claimed in claim 5 wherein the diameters of the various sections of said conducting member are selected so that the resistance of said member changes abruptly in equal increments for equal incremental changes in said analog current.

7. The combination comprising: current responsive, magnetic field establishing means; a body of substantially uniform thickness of one type superconductive material, portions along the length of said body being spaced substantially different distances from said field generating means, whereby said different portions are driven into the normal state at different magnetic field intensities; means for maintaining said body superconducting in the absence of a magnetic field; means for varying the current supplied to said field generating means to an extent sufficient to drive at least a portion of said body to the normal state; and output means connected across the end portions of said body.

8. The combination comprising: a conductor; means coupled to said conductor for supplying a controllable amount of current thereto; a coil of superconductive material concentric with and encircling said conductor, the inner diameter of said coil varying along the length thereof such that successive coil portions of greater diameter are located at successively greater distances from corresponding portions of said conductor and are driven from the superconducting to the normal state in succession as the current through said conductor is increased over a range of values; means for maintaining said coil at a temperature at which said coil is in the superconducting state in the absence of current flow through said conductor; and output means connected to said coil.

9. The combination as claimed in claim 8 including means for supplying a constant current to said coil.

10. The combination as claimed in claim 9, wherein said output means is a voltage responsive means connected across said coil.

11. The combination as claimed in claim 9, wherein said means for supplying a controllable amount of current to said conductor is an analog current source, and wherein the shape of said coil is selected to produce an output which is a desired function of the current applied to said conductor.

References Cited

UNITED STATES PATENTS

| | | | |
|---|---|---|---|
| 2,935,694 | 5/1960 | Schmitt et al. | 307—347 |
| 2,949,602 | 8/1960 | Crowe | 340—347 |
| 3,048,825 | 8/1962 | Schmidlin et al. | 340—173.1 |
| 3,049,686 | 8/1962 | Walters | 340—173.1 |
| 3,084,339 | 4/1963 | Crittenden et al. | 340—347 |
| 3,094,628 | 6/1963 | Jiu | 307—88.5 |
| 3,196,427 | 7/1965 | Mann et al. | 340—347 |

MALCOLM A. MORRISON, *Primary Examiner.*

ROBERT W. WEIG, *Assistant Examiner.*

U.S. Cl. X.R.

338—32; 340—173.1